US008086460B2

(12) United States Patent
Da Palma et al.

(10) Patent No.: US 8,086,460 B2
(45) Date of Patent: *Dec. 27, 2011

(54) SPEECH-ENABLED APPLICATION THAT USES WEB 2.0 CONCEPTS TO INTERFACE WITH SPEECH ENGINES

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/765,962

(22) Filed: Jun. 20, 2007

(65) Prior Publication Data
US 2008/0319758 A1 Dec. 25, 2008

(51) Int. Cl.
*G10L 21/00* (2006.01)
(52) U.S. Cl. ................................... 704/270.1
(58) Field of Classification Search .............. 704/270.1, 704/270
See application file for complete search history.

(56) References Cited

U.S. PATENT DOCUMENTS

| | | | |
|---|---|---|---|
| 6,314,402 B1 | 11/2001 | Monaco et al. | |
| 6,324,511 B1 | 11/2001 | Kiraly et al. | |
| 6,442,577 B1 | 8/2002 | Britton et al. | |
| 6,636,831 B1 | 10/2003 | Profit, Jr. et al. | |
| 6,801,604 B2 | 10/2004 | Maes et al. | |
| 6,865,599 B2 | 3/2005 | Zhang | |
| 7,143,148 B1 | 11/2006 | Hickman et al. | |
| 7,210,098 B2 * | 4/2007 | Sibal et al. | 715/205 |
| 7,287,248 B1 * | 10/2007 | Adeeb | 717/136 |
| 7,334,050 B2 * | 2/2008 | Zondervan et al. | 709/246 |
| 7,581,166 B2 | 8/2009 | Renger et al. | |
| 7,631,104 B2 | 12/2009 | Da Palma et al. | |
| 7,673,017 B2 * | 3/2010 | Kim et al. | 709/218 |

(Continued)

FOREIGN PATENT DOCUMENTS
WO 2005011921 12/2005

OTHER PUBLICATIONS

Takami et al.; A study on the architecture and voice dialog scheme for a personal Web service in a ubiquitous communication environment; IEEE, pp. 398-401, Jun. 2006.*

(Continued)

*Primary Examiner* — Abul K Azad
(74) *Attorney, Agent, or Firm* — Patents on Demand, P.A.; Brian K. Buchheit; Scott M. Garrett (57) ABSTRACT

The present invention discloses a speech-enabled application that includes two or more linked markup documents that together form a speech-enabled application served by a Web 2.0 server. The linked markup documents can conform to an ATOM PUBLISHING PROTOCOL (APP) based protocol. Additionally, the linked markup documents can include an entry collection of documents and a resource collection of documents. The resource collection can include at least one speech resource associated with a speech engine disposed in a speech processing system remotely located from the Web 2.0 server. The speech resource can add a speech processing capability to the speech-enabled application. In one embodiment, end-users of the speech-enabled application can be permitted to introspect, customize, replace, add, re-order, and remove at least a portion of the linked markup documents.

20 Claims, 5 Drawing Sheets

U.S. PATENT DOCUMENTS

| | | | |
|---|---|---|---|
| 2002/0010756 A1 | 1/2002 | Oku | |
| 2002/0052747 A1* | 5/2002 | Sarukkai | 704/270 |
| 2003/0055884 A1 | 3/2003 | Yuen et al. | |
| 2003/0088421 A1 | 5/2003 | Maes et al. | |
| 2003/0139928 A1 | 7/2003 | Krupatkin et al. | |
| 2003/0177010 A1 | 9/2003 | Locke | |
| 2005/0132056 A1 | 6/2005 | Creamer et al. | |
| 2006/0004700 A1 | 1/2006 | Hofmann et al. | |
| 2006/0015335 A1 | 1/2006 | Vennelakanti et al. | |
| 2006/0195328 A1 | 8/2006 | Abraham et al. | |
| 2007/0078884 A1* | 4/2007 | Ott et al. | 707/102 |
| 2008/0034056 A1* | 2/2008 | Renger et al. | 709/217 |
| 2008/0086689 A1 | 4/2008 | Berkley et al. | |
| 2008/0242221 A1 | 10/2008 | Shapiro et al. | |
| 2008/0319742 A1 | 12/2008 | Da Palma et al. | |
| 2008/0319757 A1 | 12/2008 | Da Palma et al. | |
| 2008/0319759 A1 | 12/2008 | Da Palma et al. | |
| 2008/0319760 A1 | 12/2008 | Da Palma et al. | |
| 2008/0319761 A1 | 12/2008 | Da Palma et al. | |
| 2008/0319762 A1 | 12/2008 | Da Palma et al. | |
| 2008/0320079 A1 | 12/2008 | Da Palma et al. | |
| 2008/0320443 A1 | 12/2008 | Da Palma et al. | |

OTHER PUBLICATIONS

O'Reilly; What is Web 2.0; Computer books-conferences-online publishing, published on O'Reilly (http://oreilly.com); pp. 1-14; Sep. 30, 2005.*

Huang, C.M., et al., "Phone-Web: Accessing WWW using a telephone set", World Wide Web, vol. 2, No. 3, pp. 161-178, 1999.

Freier, J., et al., "WebViews: Accessing Personalized Web Content and Services", Proc. of 10th Int'l. Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. of 11th Int'l. Conf. on WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G., et al., "Mobile refinding of web information using a voice interface: an exploratory study", Proc. of 2005 Latin American Conf. on Human-computer interaction, Cuernavaca, Mexico, pp. 88-99, 2005.

Chang, S.E., et al., "The implementation of a secure and pervasive multimodal Web system architecture", Inf. and Software Tech., vol. 48, No. 6, pp. 424-432, Jun. 2006.

"BLIKI", [online] Wikipedia [retrieved Feb. 23, 2007] retrieved from the Internet: <http://en.wikipedia.org/wiki/Bliki>.

"Cyn.in," [online] Cynapse [retrieved Feb. 23, 2007] retrieved from the Internet: <http://www.cynapse.com/cynin>.

DeMaria, M.J., "Searching for the Right Words", Network Computing, vol. 17, No. 22, pp. 26, 28, Oct. 26, 2006.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. on Internet Technology, vol. 2, No. 2, May 2002, pp. 115-150.

Kolias, et al., "A Pervasive Wiki Application Based on VoiceXML," ACM, PETRA '08, Jul. 15-19, 2008.

Leseney, T., "Push-to-blog", Siemens AG, Oct. 2004.

Nottingham, M., et al., "Request for Comments (RFC) 4287: The Atom Syndication Format," The Internet Society, Dec. 2005, 43 pages.

Schaffert, et al., "IkeWiki: A Semantic Wiki for Collaborative Knowledge Management,"IEEE Int'l. Workshops on Enabling Technologies: Infrastructure for Collaborative Enterprises, 2006.

"SuiteTwo: Features", [online] Moveable Type, 2006 [retrieved Feb. 23, 2007] retrieved from the Internet: < http://suitetwo.com/features>.

"Wiki," [online] Wikipedia [retrieved Feb. 23, 2007] retrieved from the Internet: <http://en.wikipedia.org/wiki/Wiki>.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

US Patent No. 7631104, Notice of Allowance, Jul. 29, 2009.

US Pub. No. 20080320079, Office Action 1, Jun. 30, 2010.

US Pub. No. 20080319762, Office Action 1, Jun. 11, 2010.

US Pub. No. 20080319760, Office Action 1, Jul. 12, 2010.

* cited by examiner

```
<entry xmlns="http://www.w3.org/2005/Atom"> <-- Blog entry
<title>Your Name </title>
<updated>2005-09-02T10:30:00Z</updated>
<summary>Your Name </summary>
<content type="xhtml" xml:lang="en"> <-- Markup of choice goes inside <content> tag
<div>
<p>doShowPrompt(); </p> <-- Ajax used for voice output, via APP protocol
<form action="backEndServlet" method="get">
Full Name:
<input type="text" name="fullname" value="Mickey Mouse"
onFocus="doAjax_ASR('entername',this)" /> <-- Ajax used for voice input, via APP protocol
<br />                                              520
<input type="submit" value="Submit" />
</form>
</div>
</content>
</entry>
```

SPEECH-ENABLED APPLICATION THAT USES WEB 2.0 CONCEPTS TO INTERFACE WITH SPEECH ENGINES

CROSS-REFERENCE TO RELATED APPLICATIONS

This application is related to, and the teachings of which are incorporated herein by reference in their entirety, the following United States Applications for Patent entitled: "SPEECH PROCESSING SYSTEM BASED UPON A REPRESENTATIONAL STATE TRANSFER (REST) ARCHITECTURE THAT USES WEB 2.0 CONCEPTS FOR SPEECH RESOURCE INTERFACES", filed Jun. 20, 2007, assigned U.S. application Ser. No. 11/765,900, and identified internally by; and, "SPEECH PROCESSING METHOD BASED UPON A REPRESENTATIONAL STATE TRANSFER (REST) ARCHITECTURE THAT USES WEB 2.0 CONCEPTS FOR SPEECH RESOURCE INTERFACES", filed Jun. 20, 2007, assigned U.S. application Ser. No. 11/765,928, and identified internally by, both of which are assigned to the assignee of the present application.

BACKGROUND

1. Field of the Invention

The present invention relates to the field of speech processing technologies and, more particularly, to a speech-enabled application that uses Web 2.0 concepts to interface with speech engines.

2. Description of the Related Art

In the past, companies having a Web presence thrived by providing as many people broad access to as much information as possible. Information flow was unidirectional, from a company to information consumers. As time has progressed, users have become inundated with too much information from too many sources. Successful Web sites began to provide user-facing information management and information filtration mechanisms designed to aid users in identifying information of interest. Even these Web sites were somewhat flawed in a sense that information still flowed in a unidirectional manner. A user was limited to information gathered and groomed by a particular information provider.

A new type of Web application began to emerge which emphasized user interactions and two-way information exchange. These new Web applications operated more as information marketplaces were people shared information and not as information depots where users accessed a semi-static reservoir of information. This new Web and set of Web applications can be referred to as Web 2.0, where Web 2.0 signifies a second generation of Web based services and applications that emphasize online collaboration and information sharing among users. In other words, a Web 1.0 application would be one that was effectively read-only from a user perspective, whereas a Web 2.0 application would provide read, write, and update access to end-users. Web 2.0 users can fundamentally change a Web 2.0 application.

Specific examples of Web 2.0 instances include WIKIs, BLOGs, social networking sites, FOLKSONOMIEs, MASHUPs, and the like. All of these Web 2.0 instances allow end-users to add content, which other users are able to access. A value of a Web 2.0 Web site is enhanced by the user provided content and may even be completely dependent upon it.

For example, WIKIPEDIA (e.g., one Web 2.0 application) is a WIKI based encyclopedia where each end-user is able to view, add, and edit content. No content would exist without end-user contributions. Information accuracy results from an end-user population constantly updating erroneous entries which other users provide. As new innovations emerge, customers update and add WIKIPEDIA entries that describe these new innovations. Other examples of Web 2.0 applications include MYSPACE.com, YOUTUBE.com, DEL.ICIO.US.com, CRAIGSLIST.com, and the like.

Currently, a schism exists between speech processing technologies and Web 2.0 applications, meaning that Web 2.0 instances do not generally incorporate speech processing technologies. One reason for this is that conventional interfaces to speech resources are too complex for an average end-user to utilize. For this reason, speech technologies are typically only available from Web sites/services that provide a unidirectional flow of information. For example, speech technologies are commonly used by enterprises to handle routine customer interactions via a telephone interface, such as providing bank balances and the like.

One problem contributing to the schism is that speech processing technologies are currently implemented using a non-uniform interface and the Web 2.0 is generally based upon a uniform interface. That is, speech processing operations are accessed via function calls, method invocations, remote procedure calls (RPC), and other messages that are only understood by a specific server or a small subset of components. A specific invocation mechanism and required parameters must be known by a client and must be integrated into an interface. A non-uniform interface is characteristic of RPC based techniques, which includes Simple Object Access Protocol (SOAP), Common Object Request Broker Architecture (CORBA), Distributed Component Object Model (DCOM), JINI, and the like. Without deliberate integration efforts, however, the chances that two software objects designed from an unconstrained architecture are near nil. At best, an ad hoc collection of software objects having vastly different interface requirements result from the RPC style architecture. The lack of uniform interfaces makes integrating speech processing capabilities for each RPC based application a unique endeavor fraught with application specific challenges which usually require significant speech processing design skills to overcome.

In contrast, a uniform interface exists that includes a few basic primitive commands (e.g., GET, PUT, POST, DELETE) that act upon targets, which in a Web 2.0 context are generally able to be referenced by Uniform Resource Identifiers (URIs). A term used for this type of architecture is Representational State Transfer (REST). REST based solutions simplify component implementation, reduce the complexity of connector semantics, improve the effectiveness of performance tuning, and increase the scalability of pure server components. The Web (e.g., hypertext technologies) in general is founded upon REST principles. Web 2.0 expands these REST principles to permit end users to add (HTTP PUT), update (HTTP POST), and remove (HTTP DELETE) content. Thus, WIKIs, BLOGs, FOLKSONOMIEs, MASHUPs, and the like are all considered RESTful since each generally follows REST principles.

What is needed to bridge the gap between speech processing resources and conventional Web 2.0 applications is a new paradigm for interfacing with speech processing resources which makes speech processing resources more available to end-users. In this contemplated paradigm, end-users would optimally be able to cooperatively and dynamically develop speech-enabled solutions which the end-users would then be able to integrate into Web 2.0 content. Thus, a more robust Web 2.0 environment that incorporates speech processing technologies will be allowed to evolve. This is a stark contrast with a conventional paradigm for interfacing with speech processing resources, which is decisively non-RESTful in nature.

SUMMARY OF THE INVENTION

The present invention discloses speech-enabled applications that use Web 2.0 concepts for interfacing with server-side speech resources. The speech-enabled applications can each be any variety of Web 2.0 application, such as WIKIs, BLOGs, social networking sites, FOLKSONOMIEs, MASHUPs, and the like. Each speech-enabled application can contain a collection of entries and resources. The entries can include Web 2.0 entries, such as WIKI entries and the resources can include speech resources, such as speech recognition, speech synthesis, speech identification, and voice interpreter resources. Each entry and resource can be further decomposed into sub-components specified at a lower granularity level. Each application resource/entry can be introspected, customized, replaced, added, re-ordered, and/or removed by end users.

The present invention can be implemented in accordance with numerous aspects consistent with the material presented herein. For example, one aspect of the present invention can include a speech-enabled application for a Web 2.0 for voice system. The application can include at least one root entry that includes an introspection entry and links to an entry collection and a resource collection. At least one of the resources in the resource collection can be a speech resource associated with a speech engine, which adds a speech processing capability to a speech-enabled application associated with the root entry. Entries of the entry collection can be markup documents served to browsers by a Web 2.0 server.

Another aspect of the present invention can include a speech-enabled application that includes two or more linked markup documents that together form a speech enabled application served by a Web 2.0 server. The linked markup documents can conform to an Atom Publication Protocol (APP) based protocol. Additionally, the linked markup documents can include an entry collection of documents and a resource collection of documents. The resource collection can include at least one speech resource associated with a speech engine disposed in a speech processing system remotely located from the Web 2.0 server. The speech resource can add a speech processing capability to the speech-enabled application.

Still another aspect of the present invention can include a speech-enabled application that includes multiple linked markup documents served by a Web 2.0 server to standard browsers. At least one of the linked markup documents can be a resource document for a speech resource associated with a speech engine. The resource document can add a speech processing capability to the speech-enabled application. The speech resource can be an automatic speech recognition (ASR) resource, a text-to-speech (TTS) resource, a speaker identification and verification (SIV) resource, a voice interpreter resource, and/or any other type of speech processing resource. The Web 2.0 server can be configured so that end-users are able to introspect, customize, replace, add, re-order, and remove at least a portion of the linked markup documents.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
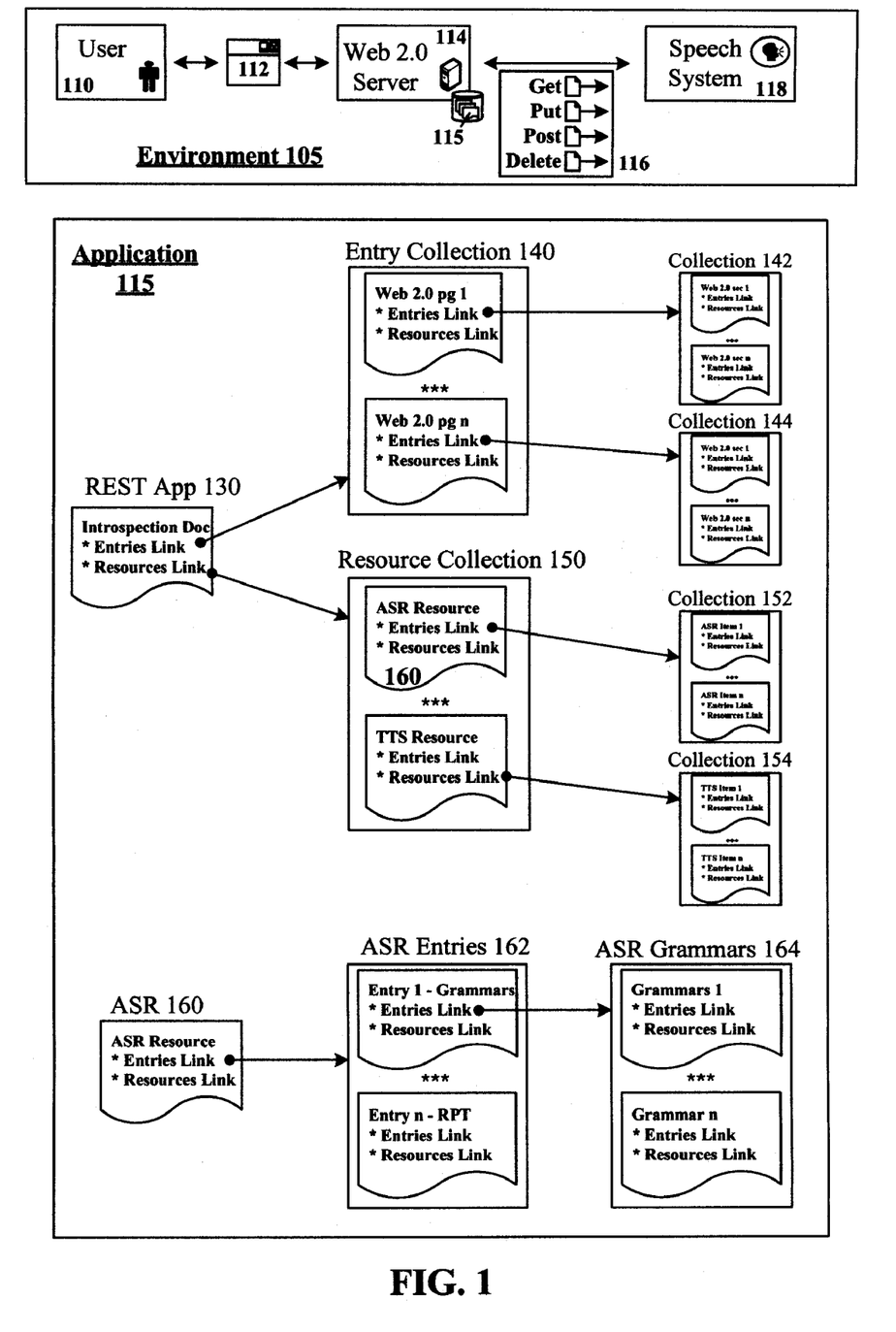
FIG. 1 is a flow diagram illustrating a speech-enabled application that utilizes Web 2.0 concepts to interface to speech engines in accordance with an embodiment of the inventive arrangements disclosed herein.

FIG. 1 is a flow diagram illustrating a speech-enabled application 115 that utilizes Web 2.0 concepts to interface to speech engines in accordance with an embodiment of the inventive arrangements disclosed herein. The speech-enabled application 115 can be associated with an introspection document, and a collection of entries and resources. The resources can link a Web 2.0 server 114 to speech processing engines of speech system 118. End users 110 of environment 105 can be permitted to introspect, customize, add, re-order, and remove entries and resources of the collections via an interface 112, which can be a standard browser.

The Web 2.0 server can be a WIKI server, a BLOG server, MASHUP server, a FOLKSONOMY server, a social networking server, and the like. A speech system 118 can include speech processing engines which can be accessed by the server 114 through use of a set of RESTful commands 116. Further, the speech system 118 can be part of a turn-based network system, such as the WEBSPHERE VOICE SERVER. The RESTful commands 116 can include GET, PUT, POST, and/or DELETE commands. There are no assumptions regarding the client upon which the interface 112 executes other than an ability to communicate with a Web 2.0 server 114.

Details for the speech-enabled application are shown, which illustrates a RESTful application 130 having an introspection document, an entries link to the entry collection 140, and a resources link to the resource collection 150. The RESTful application is one adhering to Representational State Transfer architecture (REST) principles, such as an application conforming to the ATOM PUBLISHING PROTOCOL (APP).

An initial entry collection 140 can refer to various pages of a Web 2.0 site, such as pages of a WIKI site. Each page can have an associated entry. Additionally, each page can link to other collections 142 and 144. When the collection 142 is a collection of entries, further decomposition of the corresponding Web 2.0 page can be specified. For example, Collection 142 can specify one or more sections of a Web 2.0 page. Additionally, each entry of collection 140 (or any other collection) can specify entity specific resources. These resources can be activated when the corresponding entity is active. When lower-level entries are active, all "parent" entries and their resources can also be active.

The resource collection 150 can include an entries link used to configure the associated resource and can include links to other resources (collections 152 and 154). Resources can include any of a variety of computing resources including, but not limited to, speech processing resources, media delivery resources, and the like. Speech processing resources can include automatic speech recognition resources (ASR) 160, text-to-speech resources, speaker identification and verification (SIV) resources, voice interpreter resources, and the like. Media delivery resources can include Real Time Protocol (RTP), Real Time Streaming Protocol (RTSP), Media Resource Control Protocol (MRCP) resources, and the like.

The ASR 160 resource is further decomposed in FIG. 1 to illustrate a manner in which entries can be used to configure resources. More specifically, the ASR 160 resource can link to ASR entries 162, which include grammars, delivery protocols, and the like. The grammar entry can link to ASR grammars 164, which include a grammar 1, a grammar 2 . . . grammar n. Grammars of the ASR grammars 164 can include context dependent grammars, which are linked to specific Web 2.0 pages or sections. The grammars 164 can also include one or more speaker dependent grammars that are specific to a user of the application 115.

It should be re-emphasized that end users 110 can be permitted to edit, add, delete, and/or otherwise configure or personalize the entries or resources (items 130-164) of the speech-enabled application 115. Thus, the application 115 provides a personalized experience tailored to an end-user 110. Additionally, the end-user can create and publish a speech-enabled application 115 using standard Web 2.0 server 114 creation mechanisms and are not required to create/manipulate a speech processing client interface specific to the speech system 118.

As used herein, Web 2.0 is a concept that refers to a cooperative Web in which end-users 110 add value by providing content, as opposed to Web systems that unidirectionally provide information from an information provider to an information consumer. In other words, Web 2.0 refers to a readable, writable, and updateable Web. While a myriad of types of Web 2.0 applications exist, some currently popular ones include WIKIs, BLOGs, MASHUPs, FOLKSONOMIEs, social networking sites, and the like.

A REST approach focuses on utilizing a constrained operation set (e.g. commands 116), such as GET, PUT, POST, and DELETE, to act against a set of structured targets, which can be URL addressable. A REST architecture is a client/server architecture which is stateless, cacheable, and layered by nature. REST replaces a paradigm of do-something with a make-something-so concept. That is, instead of attempting to execute a kind of state transition for a software object, the REST concept changes a state of a software object to a user designated state. A RESTful object is one which primarily conforms to REST concepts. A RESTful interface (e.g., interface 112) can be a simple interface that transmits domain-specific data using a HyperText Transfer Protocol (HTTP) based protocol without utilizing an additional messaging layer, such as SOAP, and without reliance upon session tracking HTTP cookies.

Figure 2:
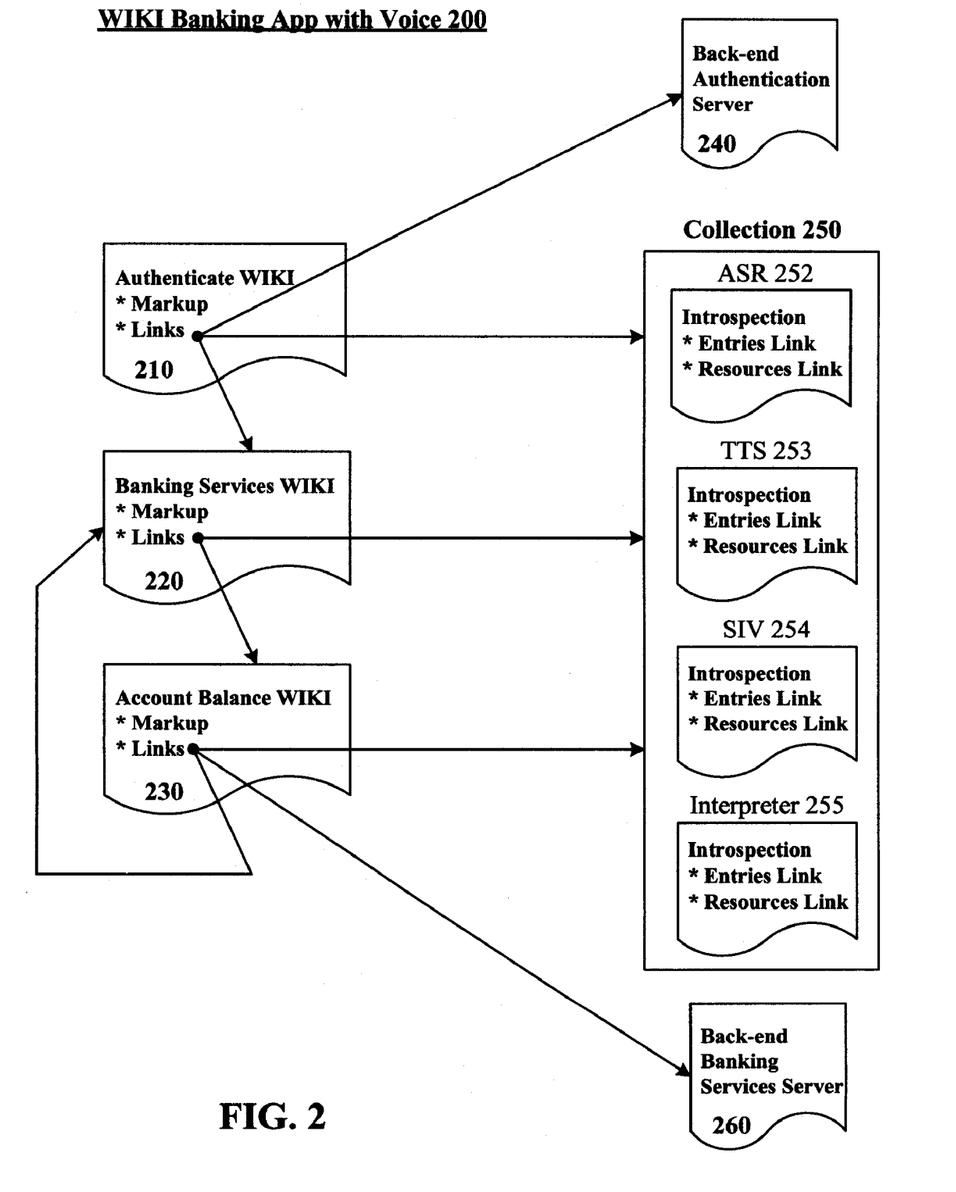
FIG. 2 is a diagram showing a sample a speech-enabled application that utilizes Web 2.0 concepts in accordance with an embodiment of the inventive arrangements disclosed herein.

FIG. 2 is a diagram showing a sample speech-enabled application that utilizes Web 2.0 concepts in accordance with an embodiment of the inventive arrangements disclosed herein. The sample application is a WIKI banking application with voice 200. The application can be executed in a context of environment 105 of system 100, where the Web 2.0 server 114 is a WIKI server. The invention is not to be construed as limited to WIKIs, however, and any type of Web 2.0 application can be implemented in the illustrated manner. Further, although the sample application is a banking application 200, any type of application for any purpose can be implemented using the techniques illustrated by sample application 200.

The WIKI banking application 200 includes a collection 210-230 of WIKI pages that include an authenticate entry 210, a banking services entry 220, and an account balance entry 230. The entries 210-230 can be linked to back-end systems 240 and 260 and to a collection 250 of resources. The collection 250 can include speech processing resources, such as an ASR resource 252, TTS resource 253, SIV resource 254, and voice interpreter resource 255. Resources of collection 250 can be utilized by associated entries 210-230 as needed.

The authenticate entry 210 can be a WIKI that performs authentication of the user with a back-end server 240. For example, a user accessing entry 210 can enter an account number and PIN to authenticate themselves responsive to being prompted. The basic WIKI markup of entry 210 can contain links to a back-end server 240 for authentication, a link to the next WIKI 220 in the application, a link to a help Wiki (not shown), and links to ASR 252 and TTS 253 resources. Entry 210 can include voice input and output (TTS or pre-recorded audio welcome prompt). The markup of WIKI 210 can include a welcome prompt, prompts for authentication information, confirmation prompts, and the like. In one embodiment, speech identification and verification can be performed by WIKI 210, which can utilize SIV resource 254.

The banking services entry 220 can be a WIKI that queries a user for a banking service of interest, such as savings services, checking services, account balance services, and the like. The WIKI 220 can then direct a user to a selected service. A user's account number can be obtained from entry 210 via the link between entries 210 and 220. Entry 220 can include links to ASR 252 and TTS 253 resources, as well as a link to a voice interpreter resource 255. Entry 220 does not include links to back-end servers, but does include a link to account balance entry 230 (and other service entries not shown).

The account balance entry 230 can be a WIKI that finds an account balance for a user by connecting to a bank-end banking services server 260. The user's account number used by WIKI 230 can be obtained from entry 210 or entry 220. Entry 230 can utilize a TTS resource 253 when speech output is desired. An amount of money in a user's account can be conveyed from the server 260 and presented to a user through a WIKI interface. The WIKI 230 can also link back to the banking services WIKI 220, so that a user can perform other banking services after hearing their account balance.

Figure 3:
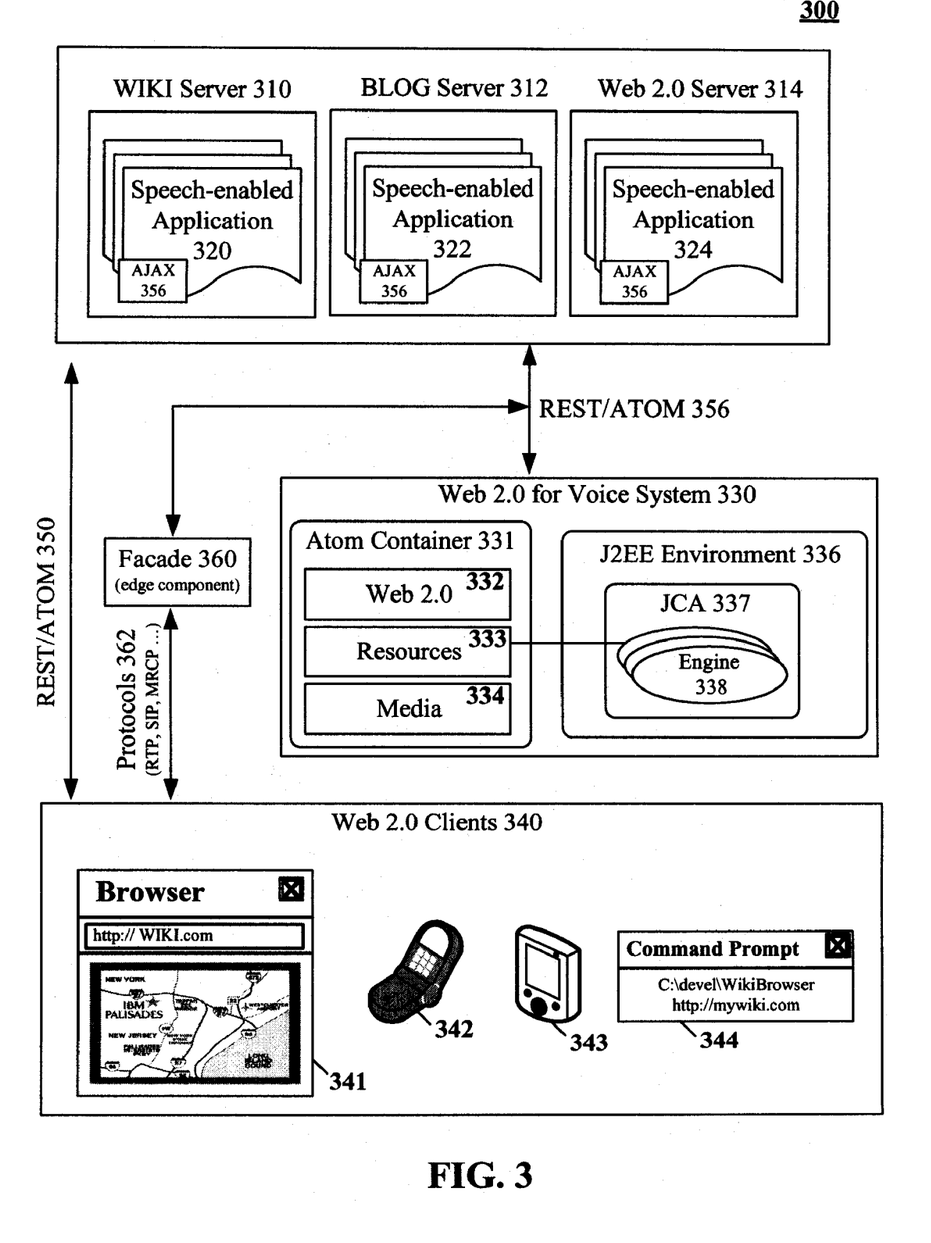
FIG. 3 is a schematic diagram of a system for a Web 2.0 for voice system in accordance with an embodiment of the inventive arrangements disclosed herein.

FIG. 3 is a schematic diagram of a system 300 for a Web 2.0 for voice system 330 in accordance with an embodiment of the inventive arrangements disclosed herein. System 300 can be a system capable of executing the speech enabled application described in FIG. 1 and/or FIG. 2.

In system 300, Web 2.0 clients 340 can communicate with Web 2.0 servers 310-314 utilizing a REST/ATOM 350 protocol. The Web 2.0 servers 310-314 can serve one or more speech-enabled applications 320-324, where speech resources are provided by a Web 2.0 for Voice system 330. One or more of the applications 320-324 can include AJAX 356 or other JavaScript code. In one embodiment, the AJAX 356 code can be automatically converted from WIKI or other syntax by a transformer of a server 310-314.

Communications between the Web 2.0 servers 310-314 and system 330 can be in accordance with REST/ATOM 356 protocols. Each speech-enabled application 320-324 can be associated with an ATOM container 331, which specifies Web 2.0 items 332, resources 333, and media 334. One or more resource 333 can correspond to a speech engine 338.

The Web 2.0 clients 340 can be any client capable of interfacing with a Web 2.0 server 310-314. For example, the clients 340 can include a Web or voice browser 341 as well as any other type of interface 344, which executes upon a computing device. The computing device can include a mobile telephone 342, a mobile computer 343, a laptop, a media player, a desktop computer, a two-way radio, a line-based phone, and the like. Unlike conventional speech clients, the clients 340 need not have a speech-specific interface and instead only require a standard Web 2.0 interface. That is, there are no assumptions regarding the client 340 other than an ability to communicate with a Web 2.0 server 310-314 using Web 2.0 conventions.

The Web 2.0 servers 310-314 can be any server that provides Web 2.0 content to clients 340 and that provides speech processing capabilities through the Web 2.0 for voice system 330. The Web 2.0 servers can include a WIKI server 310, a BLOG server 312, a MASHUP server, a FOLKSONOMY server, a social networking server, and any other Web 2.0 server 314.

The Web 2.0 for voice system 330 can utilize Web 2.0 concepts to provide speech capabilities. A server-side interface is established between the voice system 330 and a set of Web 2.0 servers 310-314. Available speech resources can be introspected and discovered via introspection documents, which are one of the Web 2.0 items 332. Introspection can be in accordance with the APP specification or a similar protocol. The ability for dynamic configuration and installation is exposed to the servers 310-314 via the introspection document.

That is, access to Web 2.0 for voice system 330 can be through a Web 2.0 server that lets users (e.g., clients 340) provide their own customizations/personalizations. Appreciably, use of the APP 356 opens up the application interface to speech resources using Web 2.0, JAVA 2 ENTERPRISE EDITION (J2EE), WEBSPHERE APPLICATION SERVER (WAS), and other conventions, rather than being restricted to protocols, such as media resource control protocol (MRCP), real time streaming protocol (RTSP), or real time protocol (RTP).

A constrained set of RESTful commands can be used to interface with the Web 2.0 for voice system 330. RESTful commands can include a GET command, a POST command, a PUT command, and a DELETE command, each of which is able to be implemented as an HTTP command. As applied to speech, GET (e.g., HTTP GET) can return capabilities and elements that are modifiable. The GET command can also be used for submitting simplistic speech queries and for receiving query results.

The POST command can create media-related resources using speech engines 338. For example, the POST command can create an audio "file" from input text using a text-to-speech (TTS) resource 333 which is linked to a TTS engine 338. The POST command can create a text representation given an audio input, using an automatic speech recognition (ASR) resource 333 which is linked to an ASR engine 338. The POST command can create a score given an audio input, using a Speaker Identification and Verification (SIV) resource which is linked to a SIV engine 338. Any type of speech processing resource can be similarly accessed using the POST command.

The PUT command can be used to update configuration of speech resources (e.g., default voice-name, ASR or TTS language, TTS voice, media destination, media delivery type, etc.) The PUT command can also be used to add a resource or capability to a Web 2.0 server 310-314 (e.g. installing an SIV component). The DELETE command can remove a speech resource from a configuration. For example, the DELETE command can be used to uninstall a previously installed speech component.

The Web 2.0 for Voice system 330 is an extremely flexible solution that permits users (of clients 340) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 338 can be provided from a J2EE environment 336, such as a WAS environment. This environment 336 can conform to a J2EE Connector Architecture (JCA) 337.

In one embodiment, a set of additional facades 360 can be utilized on top of Web 2.0 protocols to provide additional interface and protocol 362 options (e.g., MRCP, RTSP, RTP, Session Initiation Protocol (SIP), etc.) to the Web 2.0 for voice system 330. Use of facades 360 can enable legacy access/use of the Web 2.0 for voice system 330. The facades 360 can be designed to segment the protocol 362 from underlying details so that characteristics of the facade do not bleed through to speech implementation details. Functions, such as the WAS 6.1 channel framework or a JCA container, can be used to plug-in a protocol, which is not native to the J2EE environment 336. The media component 334 of the container 331 can be used to handle media storage, delivery, and format conversions as necessary. Facades 360 can be used for asynchronous or synchronous protocols 362.

Figure 4:
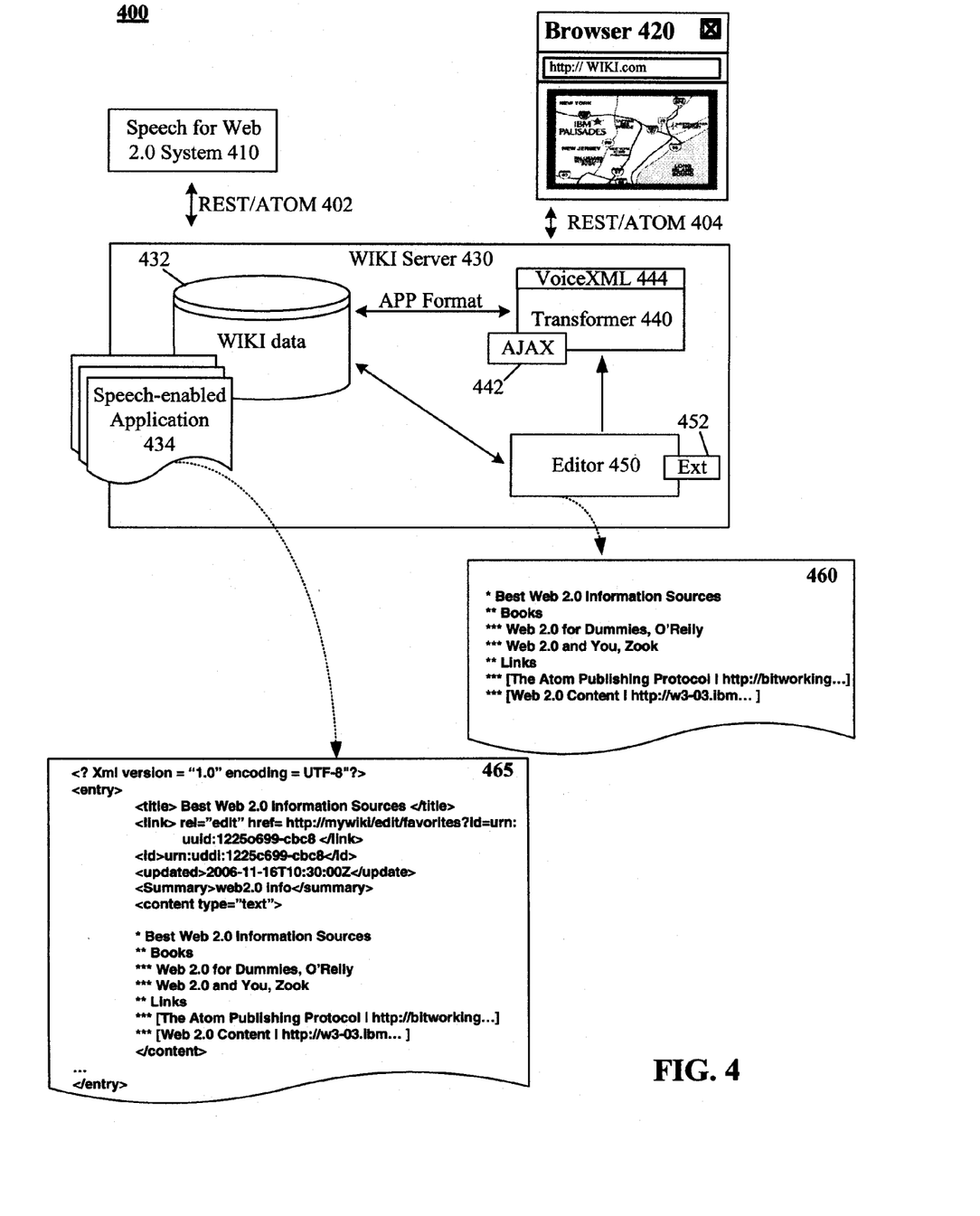
FIG. 4 is a schematic diagram showing a WIKI server adapted for communications with a Web 2.0 for voice system in accordance with an embodiment of the inventive arrangements disclosed herein.

FIG. 4 is a schematic diagram showing a WIKI server 430 adapted for communications with a Web 2.0 for voice system 410 in accordance with an embodiment of the inventive arrangements disclosed herein. Although a WIKI server 430 is illustrated, server 430 can be any WEB 2.0 server (e.g., server 120 of system 100 or server 310-314 of system 300) including, but not limited to, a BLOG server, a MASHUP server, a FOLKSONOMY server, a social networking server, and the like.

In system 400, a browser 420 can communicate with Web 2.0 server 430 via Representational State Transfer (REST) architecture/ATOM 404 based protocol. The Web 2.0 server 430 can communicate with a speech for Web 2.0 system 410 via a REST/ATOM 402 based protocol. Protocols 402, 404 can include HTTP and similar protocols that are RESTful by nature as well as an Atom Publishing Protocol (APP) or other protocol that is specifically designed to conform to REST principles.

The Web 2.0 server 430 can include a data store 432 in which applications 434, which can be speech-enabled, are stored. In one embodiment, the applications 432 can be written in a WIKI or other Web 2.0 syntax and can be stored in an APP format.

The contents of the application 432 can be accessed and modified using editor 450. The editor 450 can be a standard WIKI or other Web 2.0 editor having a voice plug-in or extensions 452. In one implementation, user-specific modifications made to the speech-enabled application 434 via the editor 450 can be stored in customization data store as a customization profile and/or a state definition. The customization profile and state definition can contain customization settings that can override entries contained within the original application 432. Customizations can be related to a particular user or set of users.

The transformer 440 can convert WIKI or other Web 2.0 syntax into standard markup for browsers. In one embodiment, the transformer 440 can be an extension of a conventional transformer that supports HTML and XML. The extended transformer 440 can be enhanced to handle JAVA SCRIPT, such as AJAX. For example, resource links of application 432 can be converted into AJAX functions by the transformer 440 having an AJAX plug-in 442. The transformer 440 can also include a VoiceXML plug-in 444, which generates VoiceXML markup for voice-only clients.

As shown in system 400, a user can create a WIKI 460 using the editor 450. Once created, the WIKI 460 can be processed by the transformer 440, which generates an XML version 465 of the WIKI, which is stored in data store 432. In one embodiment, links to speech resources added to the WIKI 460 can be transformed into suitable VoiceXML code that is included in the generated WIKI 465. In another example, specific WIKI speech extensions can be entered by a user into WIKI 460, which are converted into appropriate format in WIKI 465 for server 430 to implement the speech capabilities.

Figure 5:
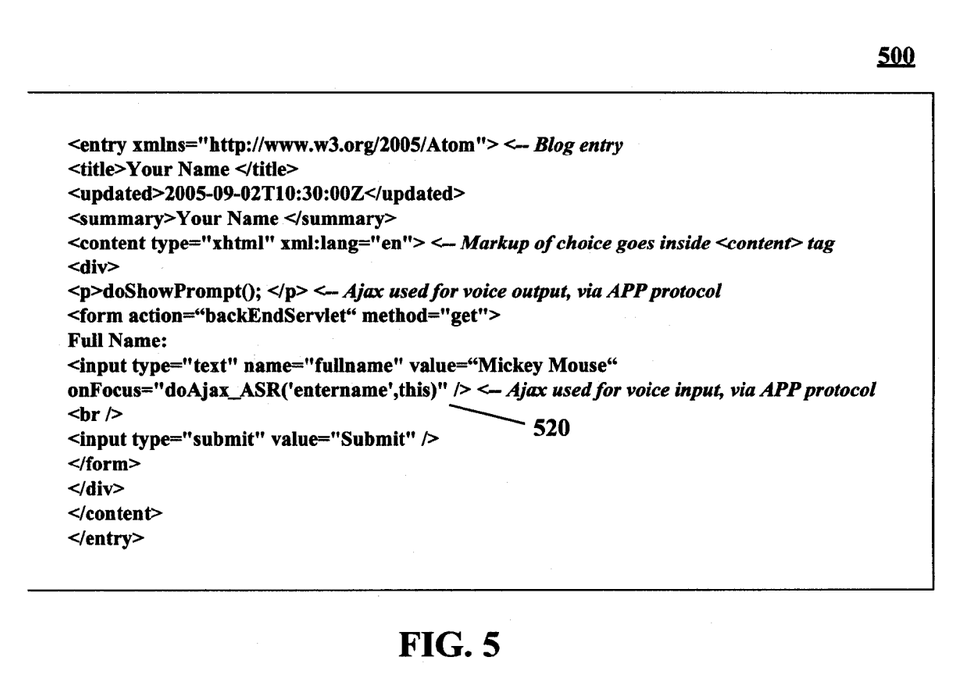
FIG. 5 illustrates a sample BLOG entry of a speech-enabled BLOG for a Web 2.0 for voice system in accordance with an embodiment of the inventive arrangements disclosed herein.

FIG. 5 illustrates a sample BLOG entry 500 of a speech-enabled BLOG for a Web 2.0 for voice system in accordance with an embodiment of the inventive arrangements disclosed herein. That is, the same techniques used for WIKI applications in FIG. 4 can be applied to BLOGs with voice, and any other type of Web 2.0 application. The BLOGs with voice can have RSS feeds for podcasting.

In entry 500, HTML is used for content. Additionally, an AJAX protocol, which can be implemented as any JAVASCRIPT based protocol, can provide a seamless interface to a speech server within the HTML, as shown by code item 520. Entry 500 can be usable for both GUI and VUI applications, as can sample application 400 of FIG. 4. Appreciably, the content of entry 500 can be written in any type of markup language including, but not limited to, XML and VoiceXML.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A speech-enabled application served by a Web 2.0 server, wherein said speech-enabled application is stored in a non-transitory storage medium and is configured to be run by a browser, said speech enabled application comprising:
at least one root entry that comprises an introspection entry and links to an entry collection of at least one entry and a resource collection of at least one resource, wherein at least one of the resources in the resource collection is a speech resource associated with a speech engine, which adds a speech processing capability to a speech-enabled application associated with the root entry, wherein an initial entry of the entry collection provides links to a plurality of different Web 2.0 pages, wherein each of the Web 2.0 pages is associated with a specific one of the entries of the entry collection, wherein each entry in the entry collection specifies a set of resources associated with that entry, which is automatically activated when that entry is activated by referring to specific resources of the resource collection corresponding to the specified set of resources.

2. The application of claim 1, wherein the introspection entry, the entry collection, and the resource collection conform to an ATOM PUBLISHING PROTOCOL (APP) based specification, and wherein the speech engine is access by the speech application through use of a set of RESTful commands comprising GET, PUT, POST, and DELETE in accordance with specifics of the entry collection and the resource collection.

3. The application of claim 1, further comprising:
JAVA SCRIPT code, which a browser rendering the application is able to execute to establish an interface between the browser and a server side speech processing system, which comprises said speech resource, and wherein each resource of the resource collection and each entry of the entry collection is able to be introspected, customized, replaced, added, reordered, and removed by end users.

4. The application of claim 1, wherein said introspection entry permits an ability to dynamically configure the speech application by adding and removing speech resources in accordance with specifics of the introspection entry.

5. The application of claim 1, wherein the speech-enabled application is at least one of a WIKI application and a BLOG application served to browsers by at least one of a WIKI server and a BLOG server, wherein the speech-application is served by a Web 2.0 server, and wherein end-users are able to create and publish the speech enabled application using standard Web 2.0 server creation mechanism and are not required to create or manipulate a speech processing client interface specific to a speech processing system that comprises the speech engine to which the speech resource is associated.

6. The application of claim 1, wherein the speech resource is linked to a speech engine of a remotely located turn-based speech processing system, wherein the speech-enabled application establishes at least one audio communication endpoint at a client of the Web 2.0 server, wherein speech input/output is conveyed over an audio communication linkage associated with the audio communication endpoint, wherein the Web 2.0 server provides read, write, and update access to end users, and wherein end-users are able to create and publish speech enabled applications including said speech-enabled application using the Web 2.0 server.

7. The application of claim 1, wherein at least one entry of the entry collection is a resource configuration entry that specifies a user-specific setting for the speech resource, and wherein the resource configuration entry is configurable by end-users of the speech-enabled application.

8. The application of claim 1, wherein the root entry includes a link to the entries collection, a link to the resource collection, and an introspection document comprising the introspection entry and otherwise lacks renderable markup code of its own, wherein all Web 2.0 content of the speech-enabled application is defined within the entries collection, wherein all speech resources are defined within the resource collection, wherein entries of the entry collection refer to resources of the resource collection causing the resources to be automatically activated when corresponding entries are activated.

9. The application of claim 1, wherein the speech resource is an automatic speech recognition resource, which is linked to at least one entry collection that includes at least one entry defining a speech recognition grammar that is to be utilized by the associated speech engine, wherein the resource collection comprises a plurality of different resource entries arranged in a parent-child relationship, wherein a child resource entry of the automatically speech recognition resource specifies a context dependent grammar, which is linked to a specific entry of the entry collection, which defines a We3b page or section to which the context dependent grammar applies.

10. The application of claim 1, wherein the speech resource is a speaker identification and verification resource, which is linked to at least one entry collection that includes at least one user configurable entry defining behavior of the associated speech engine.

11. The application of claim 1, wherein a Web 2.0 server that serves the speech-enabled application communicates with a remotely located speech processing system that comprises the speech engine utilizing a set of RESTful commands that conform to an ATOM PUBLISHING PROTOCOL (APP) based specification, and wherein said set of RESTful commands comprise an HTTP GET command, an HTTP POST command, an HTTP PUT command, and an HTTP DELETE command, wherein resource entries of the resource collection are specific to a plurality of computing resources including the speech resource and at least one media delivery resource, wherein the media delivery resource comprises at least one of a resource for real time protocol (RTP), a resource for real time streaming protocol (RTSP), and a media resource control protocol resource (MRCP).

12. A speech-enabled application served by a Web 2.0 server, wherein said speech-enabled application is stored in a non-transitory storage medium and is configured to be run by a browser, said speech enabled application comprising:
a plurality of linked markup documents together comprising a speech-enabled application served by a Web 2.0 server, said plurality of linked markup documents conforming to an ATOM PUBLISHING PROTOCOL (APP) based protocol, said linked markup documents including an entry collection of documents and a resource collection of documents, wherein said entry collection comprise content of the speech-enabled application, and wherein the resource collection comprises computing resources used in conjunction with the content, wherein each entry of the entry collection specifies a set of resource entries of the resource collection, wherein each resources of the resource collection that correspond to content of the entry collection that are automatically activated when said content is activated, wherein said resource collection comprising at least one speech resource associated with a speech engine disposed in a speech processing system remotely located from the Web 2.0 server, wherein said speech resource adds a speech processing capability to the speech-enabled application.

13. The speech-processing application of claim 12, wherein the Web 2.0 server includes an editor interface that is configured so that end-users are able to introspect, customize, replace, add, re-order, and remove entries and resources in the collections, and wherein said resource collection comprises media delivery resources, wherein said media delivery resources comprise a real time protocol (RTP) resource, a real time streaming protocol (RTSP) resource, and a media resource control protocol (MRCP) resource.

14. The speech-enabled application of claim 12, wherein the Web 2.0 server is a WIKI server that includes a WIKI editor interface, which permits users to input WIKI syntax that a transformer of the WIKI server automatically converts to VoiceXML, wherein the WIKI server is able to access resources of the speech processing engine through use of a set of RESTful commands comprising GET, PUT, POST, and DELETE.

15. The speech-enabled application of claim 12, wherein the Web 2.0 server is a WIKI server that includes a WIKI editor interface that supports rich text viewing of WIKI content, wherein end-users are able to create and publish speech-enabled applications using the WIKI editor and are not required to create or manipulate a speech processing client interface specific to a speech processing system in which the speech engine resides.

16. The speech-enabled application of claim 12, wherein the speech engine is a turn-based speech processing engine executing within a JAVA 2 ENTERPRISE EDITION (J2EE) middleware environment.

17. A speech-enabled application served by a Web 2.0 server, wherein said speech-enabled application is stored in a non-transitory storage medium and is configured to be run by a browser, said speech enabled application comprising:

a plurality of linked markup documents served by a Web 2.0 server to Web and voice browsers, wherein at least one of the linked markup documents is a resource document for a speech resource associated with a speech engine, which adds a speech processing capability to the speech-enabled application, wherein the speech resource is associated with one of an automatic speech recognition resource, a text-to-speech resource, and a speaker identification and verification resource, and wherein the Web 2.0 server is configured so that end-users are able to introspect, customize, replace, add, re-order, and remove at least a portion of the linked markup documents.

18. The application of claim 17, wherein the Web 2.0 server is a WIKI server and wherein the plurality of linked markup documents comprise WIKI pages.

19. The application of claim 17, wherein the linked markup documents form a speech-enabled BLOG, which is served by a BLOG server to BLOG clients.

20. The application of claim 17, wherein the linked markup documents are formatted in an ATOM PUBLISHING PROTOCOL (APP) format, which are served by an ATOM PUBLISHING PROTOCOL (APP) server to ATOM PUBLISHING PROTOCOL (APP) clients.

* * * * *